(12) United States Patent
Maeda et al.

(10) Patent No.: US 9,086,427 B2
(45) Date of Patent: Jul. 21, 2015

(54) INERTIAL SENSOR

(75) Inventors: Daisuke Maeda, Tokyo (JP); Heewon Jeong, Tokyo (JP); Masahide Hayashi, Hitachinaka (JP); Makoto Yamamoto, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/001,634

(22) PCT Filed: Jan. 11, 2012

(86) PCT No.: PCT/JP2012/050390
§ 371 (c)(1),
(2), (4) Date: Aug. 26, 2013

(87) PCT Pub. No.: WO2012/124358
PCT Pub. Date: Sep. 20, 2012

(65) Prior Publication Data
US 2013/0345901 A1    Dec. 26, 2013

(30) Foreign Application Priority Data

Mar. 11, 2011    (JP) .................................. 2011-054584

(51) Int. Cl.
*G01P 15/00*    (2006.01)
*G01C 19/5776*    (2012.01)
*B60W 50/00*    (2006.01)

(52) U.S. Cl.
CPC ............ *G01P 15/00* (2013.01); *G01C 19/5776* (2013.01); *B60W 2050/0055* (2013.01); *B60W 2050/0056* (2013.01)

(58) Field of Classification Search
CPC .................................. G05D 1/00; G05D 1/021
See application file for complete search history.

(56) References Cited

U.S. PATENT DOCUMENTS 3,661,347 A * 5/1972 Woodworth et al. ......... 244/191
2003/0149516 A1* 8/2003 Bolzmann et al. ............. 701/34
(Continued)

FOREIGN PATENT DOCUMENTS

JP    2005-104339 A    4/2005
JP    2006-290133 A    10/2006
(Continued)

OTHER PUBLICATIONS

Japanese-language International Search Report dated Feb. 7, 2012 with English translation (five (5) pages).
(Continued)

*Primary Examiner* — John R Olszewski
*Assistant Examiner* — Jason Roberson
(74) *Attorney, Agent, or Firm* — Crowell & Moring LLP (57) ABSTRACT

An object of the invention is to provide an inertial sensor with small delay and high accuracy. An inertial sensor 1 includes an acceleration detecting element 2 that detects an acceleration of at least one axis of a vehicle; a first filter 6 that limits a detection signal of the acceleration to a first band; a second filter 7 that limits a detection signal of the acceleration to a second band; a vehicle control variable calculation section 8 that calculates a vehicle control variable $G_{xc}$ on the basis of the detection signal of the acceleration limited to the second band; and a sensor signal output section 9 that outputs the detection signal of the acceleration limited to the first band and the vehicle control variable.

10 Claims, 6 Drawing Sheets

(56) References Cited

U.S. PATENT DOCUMENTS

| | | |
|---|---|---|
| 2005/0102084 A1 | 5/2005 | Sakata |
| 2009/0112404 A1* | 4/2009 | Imura et al. ............... 701/41 |
| 2010/0213693 A1* | 8/2010 | Foo et al. ............... 280/735 |

FOREIGN PATENT DOCUMENTS

| | | | |
|---|---|---|---|
| JP | 2007-280808 A | | 10/2007 |
| JP | 2009-107447 A | | 5/2009 |
| JP | 2010-162911 A | | 7/2010 |
| JP | 2010162911 A | * | 7/2010 |

OTHER PUBLICATIONS

Yamakado et al., "Improvement of Vehicle Agility and Stability by G-Vectoring Control," 2008, Proc. of AVEC, pp. 116-121.

* cited by examiner

INERTIAL SENSOR

TECHNICAL FIELD

The present invention relates to an inertial sensor that detects a physical value, and for example, to a sensor used to control vehicle stability.

BACKGROUND ART

It is known that it is possible to suppress a sudden change in an inertial force applied to a vehicle or a passenger, or to obtain a strong cornering force using the load shift of the vehicle by controlling a longitudinal acceleration of the vehicle according to a steering operation of the vehicle (for example, refer to NPL 1).

A basic concept of this control is expressed as Formula (1) that represents a target value of a longitudinal acceleration according to a lateral acceleration and jerk (differential value of acceleration).

[Expression 1]

$$G_{xc} = -\text{sgn}(G_y \cdot G_y^\dagger)\frac{C_{xy}}{1+Ts}|G_y'| + G_{x\_DC} \quad (1)$$

Here, $G_{xc}$ represents a target acceleration in a traveling direction (vehicle longitudinal acceleration) of a vehicle, which represents a control variable of the vehicle. $G_y$ represents a vehicle lateral acceleration, $G'_y$ represents a vehicle lateral jerk (differential of acceleration), sgn represents a function that returns a positive or negative signs of the value, $C_{xy}$ represents a gain constant, T represents a time constant, and $G_{x\_DC}$ represents a bias constant. The respective constants vary depending on a vehicle type such as a mass, center of gravity and length of a vehicle, and also vary depending on the amount of control adjustment (so-called tuning).

In a case where a control in the traveling direction of the vehicle is performed according to Formula (1), if a resultant acceleration of a longitudinal acceleration and a lateral acceleration applied to the vehicle is shown in a diagram in which the transverse axis represents the lateral acceleration $G_y$ and the longitudinal axis represents the longitudinal acceleration $G_x$, the transition thereof with time forms a curve. The curved transition indicates that a sudden change in an inertial force is small and also there is no uncomfortable ride and unnecessary acceleration and deceleration. In this way, this control appropriately controls the resultant acceleration, and is thus referred to as a "G-Vectoring control".

However, the G-Vectoring control mainly relates to a vehicle control in a normal driving state of a vehicle, that is, in a state where a steering operation of the vehicle is effective without skid, and covers almost all situations during driving of the vehicle. Thus, even a small amount of time delay or control variable error that occurs in control may give unnecessary acceleration to a driver or a passenger, to thereby cause an uncomfortable ride.

In this regard, PTL 1 discloses a technique in which jerk is estimated from a vehicle state to detect the jerk with a less delay and a small error.

On the other hand, a control for suppressing an abnormal state, that is, skid of a vehicle, is referred to as a Vehicle Dynamics Control (VDC) or an Electric Stability Control (ESC).

In the VDC control, for example, a longitudinal acceleration and a lateral acceleration of a vehicle and angular velocity with respect to a running plane of the vehicle (yaw rate) are constantly measured, an error between a lateral acceleration obtained from a running velocity v and an angular velocity r of the vehicle and the acceleration obtained by a sensor is calculated to detect a skid state, and a decelerating force is given in a direction where the error is reduced, to thereby stabilize the vehicle.

Since the G-Vectoring control mainly relates to the normal state control and the VDC control mainly relates to the abnormal state control, both the controls may be mounted together on the vehicle.

CITATION LIST

Patent Literature

PTL 1: JP-A-2007-280808

Non Patent Literature

NPL 1: M. Yamakado, M. Abe: Improvement of Vehicle Agility and Stability by G-Vectoring Control, Proc. of AVEC 2008-080420

SUMMARY OF INVENTION

Technical Problem

In the G-Vectoring control, a configuration in which control variable calculation and a sensor are provided as separate modules, as in the technique disclosed in PTL 1, has the following problems. That is, since the sensor generally includes a low pass filter that restricts a signal outside a desired band, a phase delay occurs even in a signal within the desired band. Further, in a case where transmission of sensor information is performed through a medium to which multiple terminals such as a controller area network (CAN) bus are connected, a communication delay due to communication intervention generally occurs, and thus, the transmission of sensor information is delayed. This delay until the control variable calculation is started means a delay in generation of a control variable, which causes application of unnatural acceleration to a driver or a passenger, thereby causing an uncomfortable ride.

Further, in the G-Vectoring control according to Formula (1) mentioned above, it is necessary to appropriately convert the calculated longitudinal acceleration into throttle opening or a braking force. However, since the amount of conversion varies according to situations such as a vehicle type, the number of passengers, the resistance of road surface and an inclination state, it is difficult to provide an appropriate braking force.

The invention is made in order to solve the above problems, an object thereof is to provide an inertial sensor having small delay and high accuracy.

Solution to Problem

In order to solve the problems described above, configurations disclosed in claims, for example, are adopted. The invention includes plural solutions to the above problems, however, an inertial sensor as an example thereof includes: an acceleration detecting element that detects an acceleration of at least one axis of a vehicle; a first filter that limits a detection signal of the acceleration to a first band; a second filter that limits the detection signal of the acceleration to a second band; a vehicle control variable calculation section that calculates a vehicle control variable on the basis of the detection signal of the acceleration limited to the second band; and a sensor signal output section that outputs the detection signal of the acceleration limited to the first band and the vehicle control variable.

Advantageous Effects of Invention

According to the inertial sensor of the invention, there is provided an inertial sensor having small delay and high accuracy. Other problems, configurations and effects will be apparent by description of the following embodiments.

DESCRIPTION OF EMBODIMENTS

Next, embodiments of the invention will be described in detail referring to the accompanying drawings.

The embodiments of the invention relate to an inertial sensor for realizing a brake or throttle control, called the G-Vectoring control as mentioned above, to suppress a sudden change in an inertial force of a vehicle that is in a normal state where skid does not occur in the vehicle. In addition, a brake control, called the VDC control, for controlling an abnormal state where skid occurs in a vehicle is known. In the following examples, the embodiments will be described using a vehicle in which the G-Vectoring control and the VDC control are provided together.

First Embodiment

Figure 1:
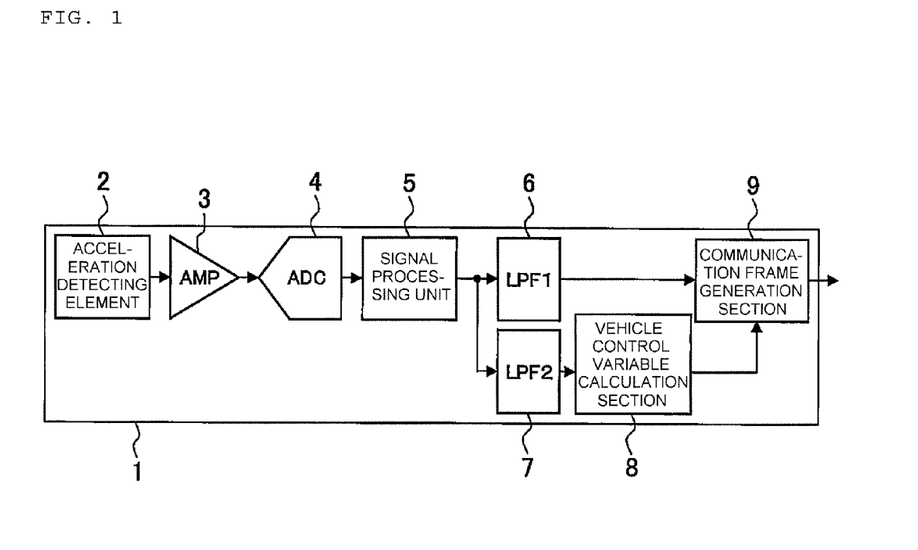
FIG. 1 is a diagram illustrating a configuration of an inertial sensor according to a first embodiment.

FIG. 1 is a diagram illustrating a configuration of an inertial sensor according to a first embodiment.

As shown in FIG. 1, an inertial sensor 1 includes a sensor module that includes an acceleration detecting element 2, an amplifier 3, an analogue to digital converter (ADC) 4, a signal processing unit 5, a first low pass filter (first filter) 6, a second low pass filter (second filter) 7, a vehicle control variable calculation section 8 and a communication frame generation section 9.

In the present embodiment, the acceleration detecting element 2 that detects acceleration from the outside is, for example, an electrostatic capacitive, so-called micro electro mechanical systems (MEMS) element that grasps mass displacement generated by application of the acceleration as a capacitance change and converts the capacitance change into a voltage signal through capacitance to voltage (C/V) conversion.

For example, in a case where a first axis is set to extend in a longitudinal direction of a vehicle, a second axis is set to extend in a width direction of the vehicle and a third axis is set to extend in a vertical direction of the vehicle, the acceleration detecting element 2 detects a longitudinal acceleration that is an axial acceleration of the first axis, a lateral acceleration that is an axial acceleration of the second axis, and a vertical acceleration that is an axial acceleration of the third axis. In the present embodiment, the acceleration detecting element 2 is individually provided corresponding to each axis, and thus, a total of three acceleration detecting elements are provided. However, one element that detects all the axial accelerations from the first axis to the third axis may be used. Further, detection performance in all the axial directions may not be provided.

The amplifier 3 converts an electric signal output from the acceleration detecting element 2 into an appropriate level. Here, in a case where ranges of acceleration required by the G-Vectoring control and the VDC control that are provided together are different from each other, the range of the amplifier 3 may be configured to be changed according to applications. Such a configuration has the following advantages.

For example, by using a configuration in which gain is increased so as to input a narrow range for the G-Vectoring control in a normal state and is decreased so as to input a wide range for the VDC control in an abnormal state, it is possible to precisely detect a small change of acceleration in the G-vectoring control, to appropriately detect a large change of acceleration in the VDC control, and to satisfy plural different specifications using one sensor.

Further, a configuration in which the level is constantly changed by time division may be used. For example, in a case where processes of 100 times per second are performed, a gain is set so as to input a narrow range for the processes of 50 times and a gain is switched so as to input a wide range for the remaining processes of 50 times, it is thus possible to detect both of the wide range and the narrow range without determining the state of the vehicle.

Furthermore, a configuration in which two or more amplifiers 3 that have different gains are provided in parallel may be used. For example, by using a configuration in which a signal from the acceleration detecting element 2 are divided into two and subsequent circuits are provided in parallel for the G-Vectoring control and the VDC control, it is possible to perform optimal detection in response to each control.

Next, the level of voltage signal output from the amplifier 3 is converted into a digital value by the ADC 4. Thus, it is possible to digitalize the signal processing unit 5 at the next stage, and to realize signal processing with low cost and high accuracy. Here, the ADC 4 may have any configuration, and may have any architecture such as a so-called flash type, pipe line type, successive approximation type and delta sigma type. Further, the digital signaling using an ADC is not necessarily provided, and a configuration in which the subsequent processes are performed in analogue circuits may be used.

Then, the digital signal passed through the ADC 4 is transmitted to the signal processing unit 5, and is processed into an appropriate form as a sensor output value. First, in a case where the signal passed through the ADC 4 undergoes a certain type of modulation, demodulation is performed here. For example, in a case where carrier signals are modulated, the signal processing section 5 performs synchronous detection of the carrier signals and demodulates the signals into a base band signal. Then, output signal shaping such as compensation for temperature change, zero point correction or sensitivity correction is performed. The above-mentioned signal processing may be performed by an exclusive LSI, or may be performed by a DSP and rewritable software corresponding to the DSP.

The first low pass filter 6 shown as a low pass filter (LPF) 1 in FIG. 1 performs a filtering process of limiting the signal processed in the signal processing unit 5 to a band for the VDC control (first band) to cut an unnecessary noise component. Further, the second low pass filter 7 shown as a low pass filter (LPF) 2 in FIG. 1 forms a filter having a frequency characteristic different from the band for the VDC control indicated by the low pass filter 6, that is, having a different cutoff characteristic, and performs a filtering process of limiting the signal processed in the signal processing unit 5 to a band for the G-Vectoring control (second band).

This means that it is possible to use the signal from the acceleration detecting element 2 in a free band regardless of an output frequency characteristic of a sensor defined by the low pass filter 6. For example, in a case where only the low band is used for control, the second low pass filter 7 may have a cutoff characteristic lower than the first low pass filter 6, or reversely, may have a cutoff characteristic higher than the first low pass filter 6 to secure responsiveness.

Further, a configuration in which the second low pass filter 7 has an infinitely high cutoff characteristic, that is, a configuration having no low pass characteristic may be used, to thereby suppress occurrence of the phase delay of the acceleration signal until the control variable calculation is performed by the vehicle control variable calculation section 8. It is because even a configuration in which the base band signal is directly transmitted to the vehicle control variable calculation section 8 at the next stage, to be described later, may be used, for example, noise removal may be performed at a separate stage or may be indirectly realized by responsiveness of an actuator. In the present embodiment, the band of the second low pass filter 7 is set to a band wider than the band of the first low pass filter 6.

Figure 2:
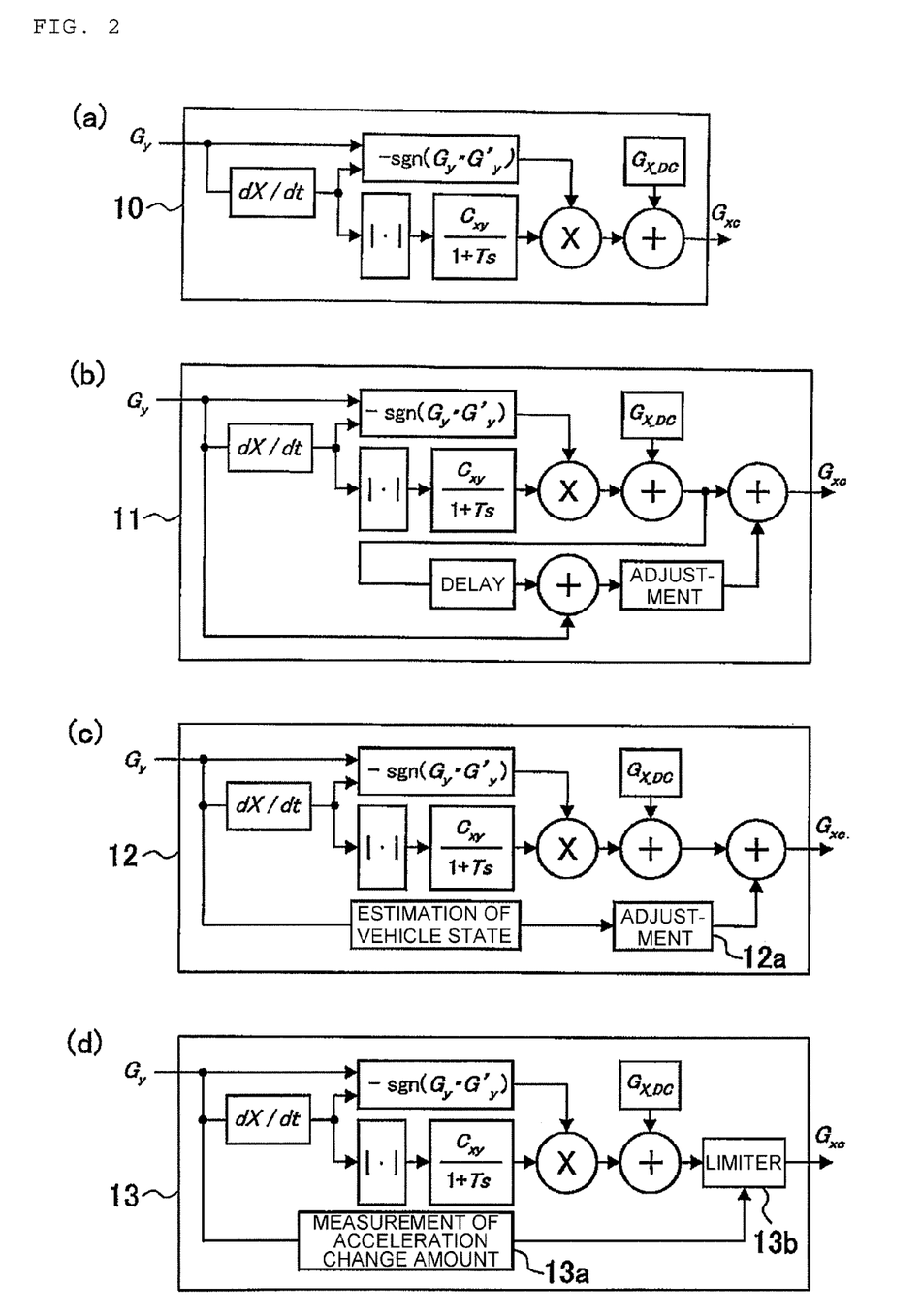
FIG. 2 is a diagram illustrating an example of a circuit configuration of a vehicle control variable calculation section.

FIG. 2 is a diagram illustrating an example of a circuit configuration of a vehicle control variable calculation section.

The vehicle control variable calculation section 8 performs calculation of Formula (1) shown in the background art using a configuration of a circuit 10 shown in FIG. 2(a), for example, that is, calculates the control variable of the longitudinal acceleration according to the lateral acceleration and the lateral jerk (differential value of the lateral acceleration).

Figure 3:
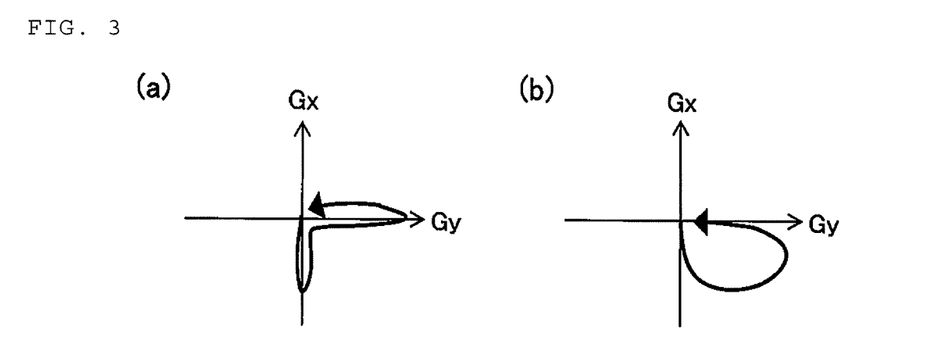
FIG. 3 is a diagram illustrating an example of resultant acceleration applied to a vehicle during cornering.

FIG. 3 is an image view of a diagram illustrating an example of a resultant acceleration applied to a vehicle during cornering. FIG. 3(a) shows a general resultant acceleration of the driver when no G-Vectoring control is applied, and FIG. 3(b) shows a resultant acceleration in a case where the G-Vectoring control is applied. In the diagram, the transverse axis represents the lateral acceleration $G_y$, and the longitudinal axis represents the longitudinal acceleration $G_x$. A curved transition of the resultant acceleration with time in a case where the G-Vectoring control shown in FIG. 3(b) is applied represents that a sudden change in an inertial force is small and also there is no uncomfortable ride and unnecessary acceleration and deceleration.

The circuit 10 in FIG. 2(a) is configured by a digital circuit or DSP software. Here, Formula (1) is not necessarily limited to a certain type, and thus, is not necessarily limited to the configuration of the circuit 10, but should be a formula that indicates a longitudinal acceleration control in association with the amount of lateral inertia. Further, in addition to the acceleration signal derived from the signal of the acceleration detecting element 2 mounted in the inertial sensor 1, a separate signal input may be used. For example, the lateral jerk may be calculated on the basis of the steering angle of a steering wheel, and it is thus possible to correct an error by inputting a steering angle signal in addition to the acceleration signal, and to enhance the accuracy of a sensor value, thereby enhancing reliability.

Further, constants included in the vehicle control variable calculation section 8 are retained as the constants are written at the time of shipment in a programmable read only memory (PROM) or a Flash read only memory (ROM). Here, the constants may be retained in a random access memory (RAM) to be dynamically changed, as described later.

Further, if a configuration in which the acceleration detecting element 2 and the vehicle control variable calculation section 8 are closed in the inertial sensor 1, that is, a configuration in which the acceleration detecting element 2 and the vehicle control variable calculation section 8 are integrally formed as a module and signal exchange is performed in the module is used, it is possible to confirm whether the control is appropriately performed without the addition of separate hardware using a feedback configuration, to thereby dynamically adjust the constants.

For example, by using a configuration of a circuit 11 shown in FIG. 2(b), an acceleration Ac that is given as a target may be calculated with respect to an actual acceleration Aa applied in a vehicle direction, it may be checked whether an acceleration Aa' after a control delay and a vehicle dynamics delay are gone through is the same as a difference (Aa-Ac) between the actual acceleration Aa and the target acceleration Ac, and then, an adjustment for dynamically changing a gain or a bias of the vehicle control variable may be performed so as to correct the difference.

In general, if the vehicle type is changed, the number of passengers in a vehicle is changed, or the state of the road surface and vehicle (whether the vehicle is on a slope or the vehicle is on a rainy road, for example) is changed, the weight or balance of the vehicle is changed, and thus, the amount of appropriate operation in a brake or throttle opening is changed with respect to a desired acceleration change amount.

Accordingly, by using a configuration of the circuit 11 in which the function of dynamic gain adjustment is mounted, for example, it is possible to mount the inertial sensor 1 on an arbitrary vehicle without any specific preadjustment regardless of the vehicle type, and to provide an appropriate longitudinal acceleration (vehicle control variable) without performing adjustment even in a situation where the number of passengers is dramatically changed from one to eight, which is effective for reduction of the adjustment cost.

In this way, as the acceleration detection, the acceleration processing, vehicle control calculation and its feedback adjustment are all performed in the closed configuration of the inertial sensor 1, the amount of delay is effectively reduced, and the system configuration cost is also effectively reduced.

Further, a configuration may be realized in which the acceleration detecting element 2 and the vehicle control variable calculation section 8 are closed and are individually used in the inertial sensor 1, a current inclined state of the vehicle is confirmed from the bias component of the acceleration sensor without addition of separate hardware, and the amount of braking operation or a gain of throttle opening is adjusted in advance.

For example, when a downslope forms an angle of θ with respect to the horizontal plane in association with the acceleration of gravity g (=9.8 m/s²) applied to the vehicle, a bias of g·sin(θ) appears in the longitudinal acceleration detecting element 2, and the acceleration of gravity applied to the vertical acceleration detecting element 2 is decreased to g·cos(θ). That is, by analyzing the signal component of the acceleration detecting element 2 in at least one axial direction, it is possible to perform the determination of slope.

Using this principle, by simply performing adjustment in advance in an adjusting section 12a of a circuit 12 shown in FIG. 2(c) so that the amount of brake control is increased and the amount of throttle opening control is decreased in a downslope, and reversely, the amount of brake control is decreased and the amount of throttle opening control is increased in an upslope, it is possible to reduce an inertial amount change generated by application of an additional vehicle control that is performed for correction of an error of a vehicle control after occurrence of the vehicle control, and to prevent an uncomfortable ride.

In this way, as the acceleration detection, the acceleration processing, vehicle state estimation and adjustment amount according to vehicle situations are all performed in the closed configuration of the inertial sensor 1, it is possible to provide an appropriate vehicle control variable even in such a situation where the vehicle control variable varies as in a slope, to thereby effectively achieve an comfortable ride.

Further, a configuration may be used in which the acceleration detecting element 2 and the vehicle control variable calculation section 8 are closed and are individually used in the inertial sensor 1, the amount of change in the acceleration detecting element generated by control is constantly detected without addition of separate hardware, and the control variable is suppressed within a predetermined range in a case where a sudden change by which the change amount exceeds a predetermined threshold value occurs.

For example, a circuit 13 shown in FIG. 2(d) has a configuration in which an acceleration change amount is measured by an acceleration change amount measuring section 13a and a vehicle control variable $G_{xc}$ is limited by a limiter 13b on the basis of the acceleration change amount. In this case, a user may set a desired maximum control variable, or the maximum control variable may be set depending on a vehicle type at the time of shipment of a vehicle so that a control that causes a driver or a passenger to feel danger or fear is not performed. Thus, it is possible to provide the maximum value of an appropriate control variable at low cost.

Further, the feedback configuration shown in the circuit 11, the slope detection configuration shown in the circuit 12, and the configuration mounted with the limiter shown in the circuit 13 may be provided together. Further, it is possible to provide a circuit in which all the respective configurations of the circuits 11 to 13 are combined, or to provide a circuit in which two configurations of the respective configurations are selectively combined. In this way, by providing the circuit in which at least two or more of the respective configurations of the circuits 11 to 13 are combined, it is possible to achieve the effects corresponding to the combined configurations using one circuit, without increase in the scale of circuits.

Even in a case where only one circuit of the circuits 11 to 13 is individually used without combination of the circuits 11 to 13, it is possible to obtain a vehicle control variable that is effective for the G-Vectoring control, and to additionally achieve the effects due to the unique configurations of the respective circuits such as a feedback configuration. Thus, it is possible to achieve much more effects compared with the configuration of the circuit 10, which is useful.

Figure 4:
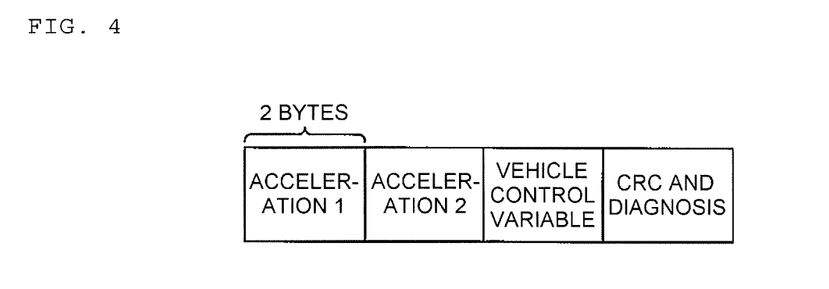
FIG. 4 is a diagram illustrating a structure of a communication frame according to the first embodiment.

FIG. 4 is a diagram illustrating an example of a structure of a communication frame according to the present embodiment.

The communication frame generation section 9 has a configuration (sensor signal output section) that generates a communication frame having an acceleration and a vehicle control variable and outputs the result as a sensor signal. Thus, for example, a longitudinal acceleration 1 and a lateral acceleration 2 that are limited to a band for the VDC control (first band) that is filtered by the first low pass filter 6, and a vehicle control variable are transmitted using the same frame.

In FIG. 4, a frame is allocated to have different information every two bytes, as an example. The communication frame generation section 9 outputs an acceleration of at least one axis and a vehicle control variable. Here, the same frame is not necessarily used, but division of the frame is not appropriate in view of delay time reduction. Further, since the frame corresponds to a system that performs a brake control and is thus important in view of safety, a configuration may be used in which a cyclic redundancy check (CRC) code for detecting a bit error and a self-diagnosis result indication bit that detects malfunction of a sensor itself and notifies the result are included in the same frame.

Figure 5:
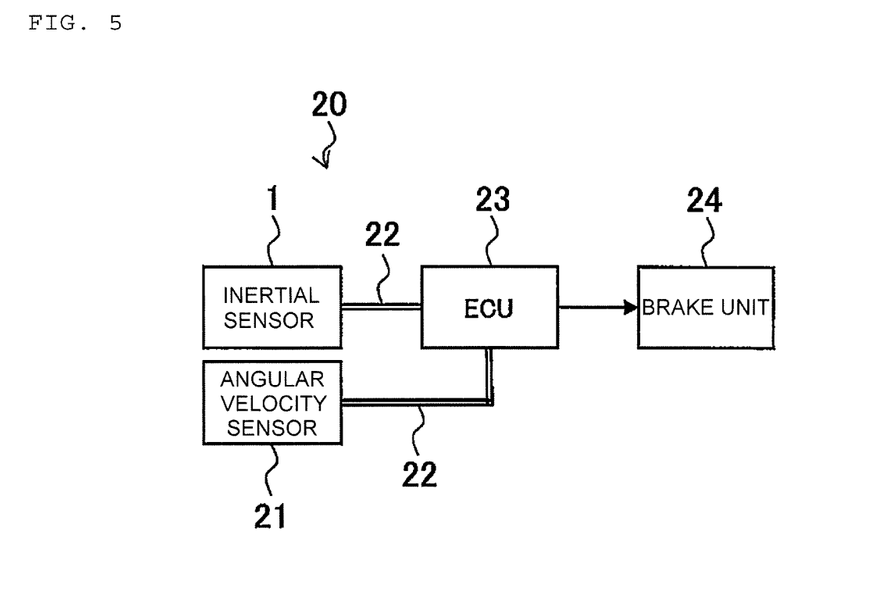
FIG. 5 is a diagram illustrating an entire configuration of a vehicle control system according to the first embodiment.

FIG. 5 is a diagram illustrating an entire configuration of a vehicle control system that uses the inertial sensor shown in FIG. 1.

A vehicle control system 20 includes an inertial sensor 1, an angular velocity sensor 21, an electric control unit (ECU) 23, and a brake unit 24. The angular velocity sensor 21 has the same configuration as the configuration of reference numerals 2 to 6 of the inertial sensor 1 shown in FIG. 1, and includes a sensor module (not shown) that includes an angular velocity detecting element 38, an amplifier, an ADC, a signal processing unit and a low pass filter.

The inertial sensor 1 and the angular velocity sensor 21 are connected to the ECU 23 through a communication line 22, respectively. The communication line 22 is communication means for realizing communication between the inertial sensor 1 and the angular velocity sensor 21, and the ECU 23, and uses a digital communication method called serial peripheral interface (SPI) communication, for example. Here, in order to prevent communication delay due to conflicts or the like among communication frames, a technique that does not use statistical multiplexing or time multiplexing is preferably used.

The ECU 23 receives an acceleration, an angular velocity and a vehicle control variable from the inertial sensor 1 and the angular velocity sensor 21, and actually performs the VDC control and the G-Vectoring control of a vehicle according to the result, and operates the brake unit 24 or the opening of a throttle (not shown). In general, in the VDC control, the control is performed using a steering angle of a steering wheel and vehicle velocity information together, and thus, this information is input to the ECU 23, which is not shown herein.

As described above, since the vehicle control variable output from the inertial sensor 1 does not have a delay occurrence factor, it is possible to suppress delay until generation of a braking force or an acceleration force due to control, and to output an appropriate control variable corresponding to a dynamic condition change without delay. Thus, an unnatural inertial force applied to a driver or a passenger is suppressed, and a vehicle control for maintaining a comfortable ride regardless of conditions is realized. Further, since addition of separate hardware is not necessary even in a case where the G-Vectoring control and the VDC control are provided together, it is not necessary to provide additional hardware to a vehicle mounted with the VDC control, which is advantageous in cost.

Second Embodiment

Figure 6:
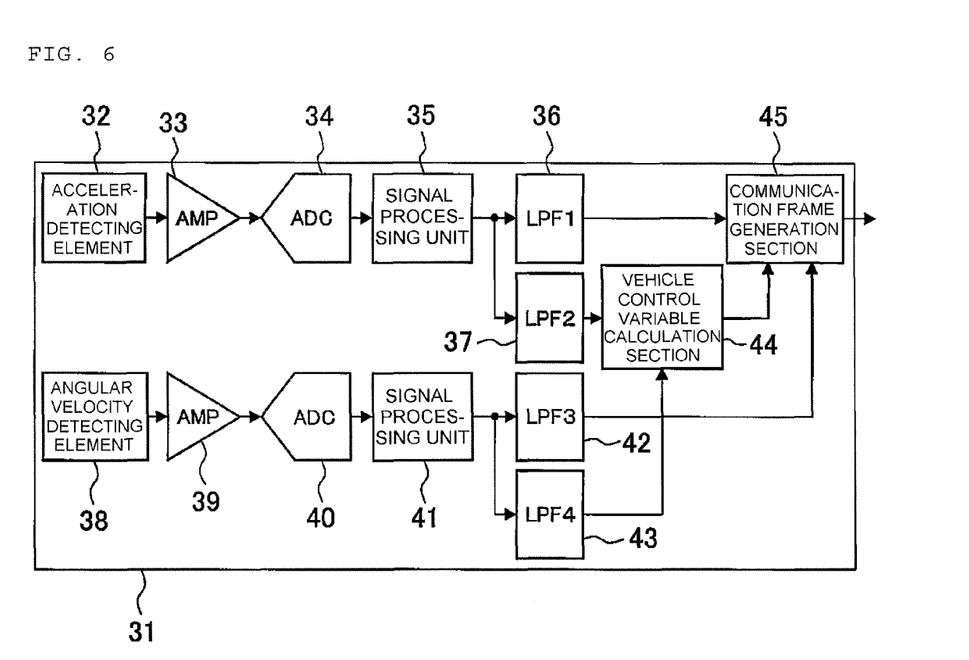
FIG. 6 is a diagram illustrating a configuration of an inertial sensor according to a second embodiment.

FIG. 6 is a diagram illustrating a configuration of an inertial sensor according to a second embodiment.

As shown in FIG. 6, an inertial sensor 31 includes a sensor module that includes an acceleration detecting element 32, an amplifier 33, an ADC 34, a signal processing unit 35, a first low pass filter (first filter) 36, a second low pass filter (second filter) 37, an angular velocity detecting element 38, an amplifier 39, an ADC 40, a signal processing unit 41, a third low pass filter (third filter) 42, a fourth low pass filter (fourth filter) 43, a vehicle control variable calculation section 44 and a communication frame generation section 45.

In the present embodiment, the angular velocity detecting element 38 of at least one axis and circuits relating thereto are provided in the inertial sensor 31, in addition to the first embodiment, to form the sensor module. Here, since configurations of reference numerals 32 to 37 are the same as the configurations of reference numerals 2 to 7 in the first embodiment, detailed description thereof is not shown.

The installation of the angular velocity detecting element 38 and the acceleration detecting element 32 may be integrated into a single chip, or may be divided into multi chips. However, the installation of the subsequent circuits has a single chip configuration that includes up to the communication frame generation section 45, rather than a multi chip configuration, to thereby reduce a communication delay.

The angular velocity detecting element 38 is an electrostatic capacitive detecting element that detects mass displacement caused by the Coriolis force generated by application of an angular velocity as a capacitance change and converts the capacitance change into a voltage signal through C/V conversion.

The angular velocity detecting element 38 detects an angular velocity in a roll direction that is an angular velocity around the first axis, an angular velocity in a pitching direction that is an angular velocity around the second axis, and an angular velocity in a yaw direction that is an angular velocity around the third axis. A total of three angular velocity detecting elements 38 are respectively provided with respect to the respective axes in the present embodiment, but a configuration may be used in which one angular velocity detecting element 38 detects the angular velocities around all the axes of the first axis to the third axis.

Since the configurations of the amplifier 39, the ADC 40 and the signal processing unit 41 are the same as the configurations of the amplifier 3, the ADC 4 and the signal processing unit 5 in the first embodiment, detailed description thereof is not shown herein.

The third low pass filter 42 (third filter) shown as an LPF 3 in FIG. 6 performs a filtering process of limiting the angular velocity detection signal processed in the signal processing unit 41 to a band for the VDC control (third band) and cutting an unnecessary noise component. Here, a frequency characteristic may be the same as or may be different from that of the first low pass filter 36 shown as the LPF 1.

The fourth low pass filter 43 (fourth filter) shown as an LPF 4 forms a filter having a frequency characteristic that is different from the band for the VDC control indicated by the third low pass filter 42, that is, having a different cutoff characteristic, and performs a filtering process of limiting the angular velocity detection signal processed in the signal processing unit 41 to a band for the G-Vectoring control (fourth band). This means that it is possible to use the signal from the angular velocity detecting element 38 in a free band regardless of an output frequency characteristic of a sensor defined by the low pass filter 42.

For example, in a case where only the low band is used for control, the fourth low pass filter 43 may have a cutoff characteristic lower than the third low pass filter 42, or reversely, may have a cutoff characteristic higher than the third low pass filter 42 to secure responsiveness.

Further, a configuration in which the fourth low pass filter 43 has an infinitely high cutoff characteristic, that is, a configuration having no low pass characteristic may be used. In this configuration, the phase delay of the angular velocity signal does not occur until the control variable calculation is performed. Therefore, for example, even a configuration in which the base band signal is directly transmitted to the vehicle control variable calculation section 44 at the next stage is used, noise removal may be performed at a separate stage or may be indirectly realized by responsiveness of an actuator. In the present embodiment, the band of the fourth low pass filter 43 is set to a band wider than the band of the third low pass filter 42.

Figure 7:
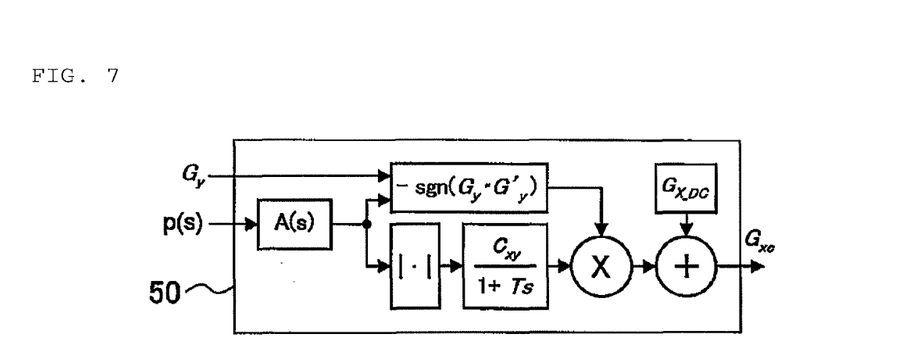
FIG. 7 is a diagram illustrating an example of a circuit configuration of a vehicle control variable calculation section.

FIG. 7 is a diagram illustrating an example of a circuit configuration of the vehicle control variable calculation section.

The vehicle control variable calculation section 44 performs calculation of Formula (1) as described above using a configuration of a circuit 50 shown in FIG. 7, for example, that is, calculates the control variable of the longitudinal acceleration according to the lateral acceleration and the lateral jerk of the vehicle. Here, as shown in PTL 1, a circuit configuration is provided in which the lateral jerk is estimated using the first axis angular velocity that is the angular velocity around the first axis of the vehicle, that is, using the angular velocity in the roll direction of the vehicle, among the angular velocity detecting elements 38. The lateral jerk may be estimated by a transfer function expressed as the following Formula (2).

[Expression 2]

$$G'_y(s) = A(s)p(s) = \frac{T_1 s + 1}{T_2 s + 1} \cdot \frac{K_x - m_s g h}{m_s g h} p(s) \qquad (2)$$

Here, A(s) represents a transfer function that converts an angular velocity in the roll direction into a lateral jerk, T1 and T2 represent appropriate time constants, Kx represents roll stiffness, ms represents sprung mass, g represents the acceleration of gravity, h represents the height from the roll center to the center of gravity, and p(s) represents an angular velocity in the roll direction.

With such a configuration, it is possible to obtain a lateral jerk that does not include delay due to a filter or communication while suppressing increase of noise due to acceleration differentiation, and it is further possible to achieve a delay suppression effect until control occurrence due to the delay. Since the lateral acceleration is obtained by integrating the lateral jerk, it is possible to determine integrity with the signal from the acceleration detecting element 32, or to realize the G-Vectoring control without using the signal of the acceleration detecting element 32.

Further, in a case where the VDC control is used together with the G-Vectoring control, since the acceleration and the angular velocity are also sensor information necessary for the VDC control, it is possible to realize both the controls using one sensor, and thus, it is not necessary to respectively provide exclusive sensors for the G-Vectoring control and the VDC control, thereby reducing the installation cost.

Figure 8:
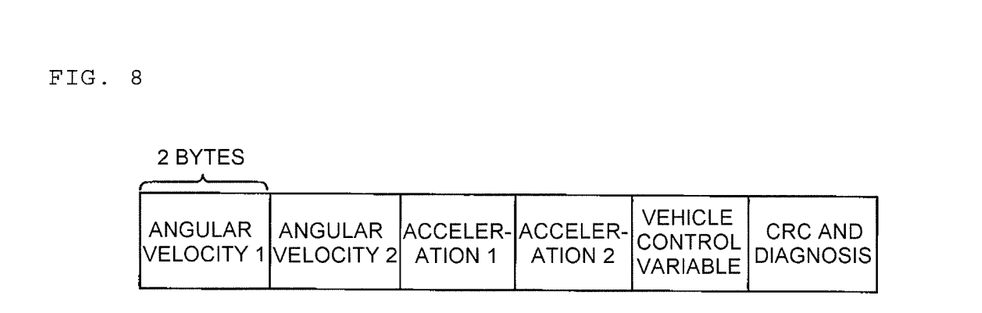
FIG. 8 is a diagram illustrating a configuration of a communication frame according to the second embodiment.

FIG. 8 is a diagram illustrating an example of a structure of a communication frame according to the present embodiment.

A communication frame generation section 45 has a configuration in which a communication frame having an acceleration, an angular velocity and a vehicle control variable is generated and is output as a sensor signal (sensor signal output section). Thus, for example, a longitudinal acceleration 1 and a lateral acceleration 2 that are limited to a band for the VDC control (first band) that are filtered by the first low pass filter 36, an angular velocity 1 in the roll direction and an angular velocity 2 in the pitching direction that are limited to a band for the VDC control (third band) that are filtered by the third low pass filter 42, and a vehicle control variable $G_{xc}$ are transmitted by the same frame.

In FIG. 8, a frame is allocated to have different information every two bytes, as an example. The communication frame generation section 45 outputs an angular velocity of at least one axis, an acceleration of one axis or more, and a vehicle control variable. Here, the same frame is not necessarily used, but division of the frame is not appropriate in view of delay time reduction. Further, since the frame corresponds to a system that performs a brake control and is thus important in view of safety, a configuration may be used in which a cyclic redundancy check (CRC) code for detecting a bit error and a self-diagnosis result indication bit that detects malfunction of a sensor itself and notifies the result are included in the same frame to enhance communication accuracy. Further, even with the angular velocity detecting element, it is possible to similarly perform various feedback corrections, state estimation corrections, and limiter corrections shown in the first embodiment.

Figure 9:
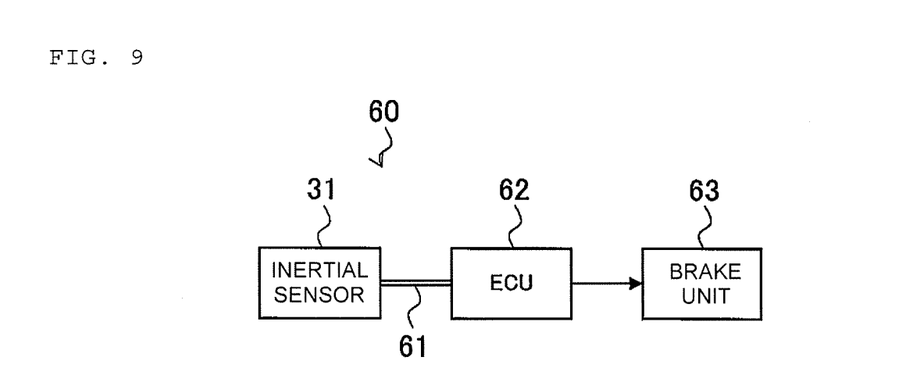
FIG. 9 is a diagram illustrating an entire configuration of a vehicle control system according to the second embodiment.

FIG. 9 is a diagram illustrating an entire configuration of a vehicle control system that uses the inertial sensor shown in FIG. 6.

The vehicle control system 60 includes an inertial sensor 31, an ECU 62, and a brake unit 63. The inertial sensor 31 is connected to the ECU 62 through a communication line 61. The communication line 61 is communication means for realizing communication between the inertial sensor 31 and the ECU 62, and uses a digital communication method called SPI communication, for example.

The ECU 62 receives an acceleration, an angular velocity and a vehicle control variable from the inertial sensor 31 and actually gives the VDC control and the G-Vectoring control to a vehicle according to the result, and thus, controls the amount of brake operation of the brake unit 63 or the throttle opening of a throttle valve (not shown). In general, in the VDC control, the control is performed using a steering angle of a steering wheel and vehicle velocity information together, and thus, the information is input to the ECU 62, which is not shown herein.

As described above, since the vehicle control variable output from the inertial sensor 31 does not have a delay occurrence factor, it is possible to suppress delay until generation of a braking force or an acceleration force due to control, and to output an appropriate control variable corresponding to a dynamic condition change without delay. Thus, an unnatural inertial force applied to a driver or a passenger is suppressed, and a vehicle control for maintaining a comfortable ride regardless of conditions is realized. Further, since addition of separate hardware is not necessary even in a case where the G-Vectoring control and the VDC control are provided together, it is not necessary to provide hardware addition to a vehicle mounted with the VDC control, which is advantageous in cost.

Third Embodiment

Figure 10:
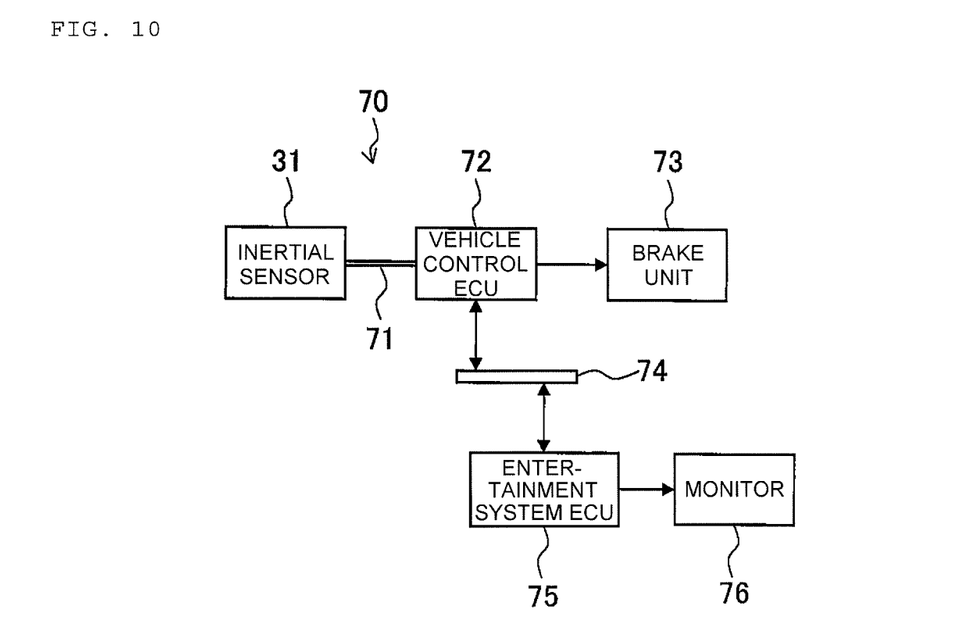
FIG. 10 is a diagram illustrating an entire configuration of a vehicle control system according to a third embodiment.

FIG. 10 is a diagram illustrating an entire configuration of a vehicle control system according to a third embodiment.

In the present embodiment, a configuration that reports the fact that the G-Vectoring control is being performed to a driver is used. A vehicle control system 70 includes an inertial sensor 31, a vehicle control ECU 72, a brake unit 73, a communication bus 74, an entertainment system ECU 75, and a monitor 76.

The inertial sensor 31 is connected to the vehicle control ECU 72 through a communication line 71. The communication line 71 is communication means for realizing communication between the inertial sensor 31 and the vehicle control ECU 72, and employs SPI communication, for example. The vehicle control ECU 72 controls the amount of brake operation of the brake unit 73 or the throttle opening of a throttle valve (not shown). The communication bus 74 is a communication bus to which multiple terminals may be connected, such as a controller area network (CAN) bus.

The vehicle control ECU 72 notifies the entertainment system ECU 75 of acceleration and a vehicle control variable through the communication bus 74. The monitor 76 is set at a position where it is visible to a driver inside a vehicle, for example, and displays acceleration on the horizontal plane applied to the vehicle. A diagram image that represents a lateral acceleration in the transverse axis and represents a longitudinal acceleration in the longitudinal axis, as shown in FIG. 3, for example, is displayed on the monitor 76, and the vehicle control variable is also displayed together.

Thus, the driver may visually confirm the effect of the G-Vectoring control. Further, by driving to reduce the control variable of the G-Vectoring control, it is possible to enhance driving skills. Thus, even if the G-Vectoring control malfunctions, it is possible to realize continuous driving without increase in such discomfort that the vehicle does not turn in a desired way during driving.

The invention is not limited to the above-described embodiments, and various modifications may be made within a range without departing from the spirit of the invention.

REFERENCE SIGNS LIST 1, 31 INERTIAL SENSOR
2, 32 ACCELERATION DETECTING ELEMENT
6, 36 FIRST LOW PASS FILTER (FIRST FILTER)
7, 37 SECOND LOW PASS FILTER (SECOND FILTER)
8, 44 VEHICLE CONTROL VARIABLE CALCULATION SECTION
9, 45 COMMUNICATION FRAME GENERATION SECTION (SENSOR SIGNAL OUTPUT SECTION)
38 ANGULAR VELOCITY DETECTING ELEMENT
42 THIRD LOW PASS FILTER (THIRD FILTER)
43 FOURTH LOW PASS FILTER (FOURTH FILTER)

The invention claimed is:
1. An inertial sensor comprising:
an acceleration detecting element that detects a longitudinal acceleration of a vehicle and a lateral acceleration of the vehicle;
a first filter that limits a detection signal of the longitudinal acceleration and a detection signal of the lateral acceleration to a first band;

a second filter that limits the detection signal of the lateral acceleration to a second band that has a higher cut-off frequency than the first band;

a vehicle control variable calculation section that calculates a vehicle control variable of the vehicle on the basis of the detection signal of the lateral acceleration limited to the second band by the second filter and a lateral jerk that is a differential value of the lateral acceleration; and a sensor signal output section that outputs the detection signal of the longitudinal acceleration and the detection signal of the lateral acceleration to an electronic control unit, both outputted detection signals being limited to the first band by the first filter, and outputs the vehicle control variable calculated by the vehicle control variable calculation section to the electronic control unit.

2. The inertial sensor according to claim 1, wherein the vehicle control variable calculation section dynamically changes a gain or a bias of the vehicle control variable on the basis of a difference between values of the longitudinal acceleration of the vehicle.

3. The inertial sensor according to claim 1, wherein the vehicle control variable calculation section dynamically changes a gain or a bias of the vehicle control variable according to a signal component that is applied to the acceleration detecting element.

4. The inertial sensor according to claim 1, further comprising:

an angular velocity detecting element that detects at least one angular velocity;

a third filter that limits a detection signal of the angular velocity to a third band; and a fourth filter that limits a detection signal of the angular velocity to a fourth band, wherein the vehicle control variable calculation section calculates the vehicle control variable on the basis of the detection signal of the lateral acceleration limited to the second band and the detection signal of the angular velocity limited to the fourth band, and wherein the sensor signal output section outputs the detection signal of the angular velocity limited to the third band and the vehicle control variable.

5. The inertial sensor according to claim 4, wherein the fourth band has a higher cut-off frequency than the third band.

6. The inertial sensor according to claim 4, wherein the angular velocity detecting element detects an angular velocity in a roll direction of the vehicle, and wherein the vehicle control variable calculation section calculates the vehicle control variable using the lateral acceleration of the vehicle and the angular velocity in the roll direction of the vehicle.

7. The inertial sensor according to claim 6, wherein the vehicle control variable calculation section dynamically changes a gain or a bias of the vehicle control variable on the basis of the longitudinal acceleration of the vehicle detected by the acceleration detecting element and the longitudinal acceleration of the vehicle calculated as the vehicle control variable.

8. The inertial sensor according to claim 6, wherein the vehicle control variable calculation section dynamically changes a gain or a bias of the vehicle control variable according to a signal component that is applied to the angular velocity detecting element.

9. The inertial sensor according to claim 4, wherein the sensor signal output section outputs the detection signal of the longitudinal acceleration limited to the first band, the detection signal of the lateral acceleration limited to the first band, the detection signal of the angular velocity limited to the third band and the vehicle control variable calculated by the vehicle control variable calculation section using the same communication frame.

10. A sensor system comprising:

a display section that displays a diagram in which a front-back direction acceleration and a lateral acceleration of a vehicle are respectively represented as two axes on a plane, wherein a longitudinal acceleration and a lateral acceleration are output from an inertial sensor, wherein the inertial sensor comprises:

an acceleration detecting element that detects a longitudinal acceleration of a vehicle and a lateral acceleration of the vehicle;

a first filter that limits a detection signal of the longitudinal acceleration and a detection signal of the lateral acceleration to a first band;

a second filter that limits the detection signal of the lateral acceleration to a second band that has a higher cut-off frequency than the first band;

a vehicle control variable calculation section that calculates a vehicle control variable of the vehicle on the basis of the detection signal of the lateral acceleration limited to the second band by the second filter and a lateral jerk that is a differential value of the lateral acceleration; and a sensor signal output section that outputs the detection signal of the longitudinal acceleration and the detection signal of the lateral acceleration to an electronic control unit, both outputted detection signals being limited to the first band by the first filter, and outputs the vehicle control variable calculated by the vehicle control variable calculation section to the electronic control unit, wherein the longitudinal acceleration and the lateral acceleration output from the inertial sensor are displayed on the display section.

* * * * *

UNITED STATES PATENT AND TRADEMARK OFFICE
CERTIFICATE OF CORRECTION

PATENT NO. : 9,086,427 B2
APPLICATION NO. : 14/001634
DATED : July 21, 2015
INVENTOR(S) : Daisuke Maeda et al.

Page 1 of 1

It is certified that error appears in the above-identified patent and that said Letters Patent is hereby corrected as shown below:

On the title page, column 1, item (75) should read:

Inventors: Daisuke Maeda, Tokyo (JP); Heewon Jeong, Tokyo (JP); Masahide Hayashi, Hitachinaka (JP); Makoto Yamakado, Tokyo (JP)

Signed and Sealed this
Sixteenth Day of February, 2016

Michelle K. Lee
*Director of the United States Patent and Trademark Office*